United States Patent [19]

Schwalm et al.

[11] Patent Number: 5,339,361
[45] Date of Patent: Aug. 16, 1994

[54] SYSTEM AND METHOD FOR AUTHENTICATING TRANSMISSION AND RECEIPT OF ELECTRONIC INFORMATION

[75] Inventors: Robert C. Schwalm, Plano; Gerhard P. H. Deffner, Dallas, both of Tex.

[73] Assignee: Texas Instruments Incorporated, Dallas, Tex.

[21] Appl. No.: 985,999

[22] Filed: Dec. 4, 1992

[51] Int. Cl.$^5$ .................. H04L 9/32; H04L 1/44; G10L 5/06; G06K 9/62
[52] U.S. Cl. .................. 380/23; 380/18; 381/42; 382/3; 340/825.34
[58] Field of Search .................. 380/23, 18, 24, 25, 380/49; 381/42; 382/3; 340/825.34

[56] References Cited

U.S. PATENT DOCUMENTS

| | | | |
|---|---|---|---|
| 4,993,068 | 2/1991 | Piosenka et al. | 380/23 |
| 5,022,080 | 6/1991 | Durst et al. | 380/23 |
| 5,127,043 | 6/1992 | Hunt et al. | 381/42 X |
| 5,222,120 | 6/1993 | McLoed et al. | 379/88 |

OTHER PUBLICATIONS

Description, installation, operation and maintenance manual for Northern Telecom Limited's integrated services network: *Meridian © M3000 Touchphone ©; Practice 553-2201-115, Issued: Jul. 29, 1986, Standard, Printed in the U.S.A.*; ©/Northern Telecom Limited 1986; 7 Chapters w/total/68 pages.

Bell Atlantic News, "Voice-Command Telephoning Being Trialed at Bell Atlantic", Dec. 17, pp. 1–4.

Texas Instruments Voice Dialing Services, Texas Instruments, DBPB089, 1992.

Texas Instruments Multiserve Media Server, Texas Instruments, DPBS300, Aug. 1992 2M.

"Enhanced Information Services Technical Report", Texas Instruments Telecom Systems, DBPB088, Dec. 1991, pp. 1–19.

"TI Announces Multiserve TM Telecommunications Platform", Texas Instruments, News Release ITG-005, pp. 1–5.

"TI and Speech: Pioneering a New Era of Enhanced Telecom Applications", Texas Instruments Editorial Backgrounder, pp. 1–5.

"Texas Instruments Multimedia Processor", Texas Instruments, DPGS299, Dec. 1991 2M.

"Enhanced Information Services—A Strategic Approach", Texas Instruments Telecom Systems, DBPB090-2M, Dec. 1991, pp. 1–12.

*Primary Examiner*—Gilberto Barrón, Jr.
*Attorney, Agent, or Firm*—Robby T. Holland; James C. Kesterson; Richard L. Donaldson

[57] ABSTRACT

A communication system (10 and 100) is provided with a verification mechanism (16) to identify both the sender and recipient of electronic information (20). Input devices (12) in cooperation with verification mechanism (16) may be used to confirm the identity and authority of a sender to place electronic information (20) on communications network (14). Output devices (18) in cooperation with verification mechanism (16) may be used to confirm the identity and authority of a recipient of electronic information (20). Verification mechanism (16) and communication network (14) may also provide the sender and the recipient with an automatic date time stamp for delivery of electronic information (20).

23 Claims, 2 Drawing Sheets

SYSTEM AND METHOD FOR AUTHENTICATING TRANSMISSION AND RECEIPT OF ELECTRONIC INFORMATION

TECHNICAL FIELD OF THE INVENTION

This invention relates in general to the field of electronic information exchange and more particularly to an improved system and method for confirming transmission and receipt of information by authorized parties.

BACKGROUND OF THE INVENTION

Users of electronic information transfer are frequently unable to control access to their transmission systems, to verify the data they send is received, when it was received, and whether it was received by an authorized person. Likewise, a recipient of electronic information is frequently unable to verify that the data they receive was sent by an authorized person or control access to the data sent to them. An electronic data interchange is one example of electronic information transfer and includes, but is not limited to facsimile transmissions, money transfers, modem transfers, security exchanges, electronic mail (E-mail), and government "secured" systems.

Systems heretofore known have allowed for transmission and receipt of electronic information, but provide no means of verifying time of receipt or the identity of the person sending or receiving the electronic information or controlling access to the systems. For example, with current facsimile technology the sender receives verification that a number of pages were transmitted to a given telephone number. The sender does not know who is physically receiving the facsimile at the other end. Likewise, the recipient of a facsimile does not know who the sender is, other than a sending telephone number and perhaps a "name" associated with the sending facsimile machine. Additionally, organizations utilizing facsimile systems for communication would like to control and limit access to their systems. The current extensive use of facsimile transmissions during contract negotiations or for sales orders, sometimes involving millions of dollars, gives rise for a need for a better system for controlling access to facsimile machines, for verifying who sent the facsimile, who received the facsimile, and providing a time-stamp for transmission and receipt of the facsimile.

Therefore, a longfelt need has arisen for a system and method which provides controlled access and confirmation of transmission and receipt of electronic information by authorized parties.

SUMMARY OF THE INVENTION

In accordance with the present invention, a system is provided which substantially eliminates or reduces disadvantages and problems associated with prior electronic information transfer systems.

According to one aspect of the invention, there is provided a system for controlling access and authenticating the transmission of electronic information. The system includes a verification mechanism and a secure storage medium with templates. Once the identity of the sender is verified by the verification mechanism, the electronic information is transmitted. More specifically, the present invention's secure storage medium is a data base which includes spoken voice and/or written signature templates for verification. More specifically, the present invention provides the sender with an automatic time stamp of receipt by the recipient of electronic information. More specifically, the present invention allows controlled access at the receiving end of the electronic information transfer by requiring identity verification of the recipient prior to receiving the electronic information.

The technical advantages of the invention include a system which (1) ensures only authorized users send and receive electronic information transmissions; (2) validates receipt of the electronic information to the sender with a time stamp; and (3) authenticates to the receiver that the sender was authorized to make the electronic information transmission.

BRIEF DESCRIPTION OF THE DRAWINGS

For a more complete understanding of the present invention and the advantages thereof, reference is now made to the following description taken in conjunction with the accompanying drawings in which the reference numbers indicate like features and wherein.

DETAILED DESCRIPTION OF THE INVENTION

Figure 1:
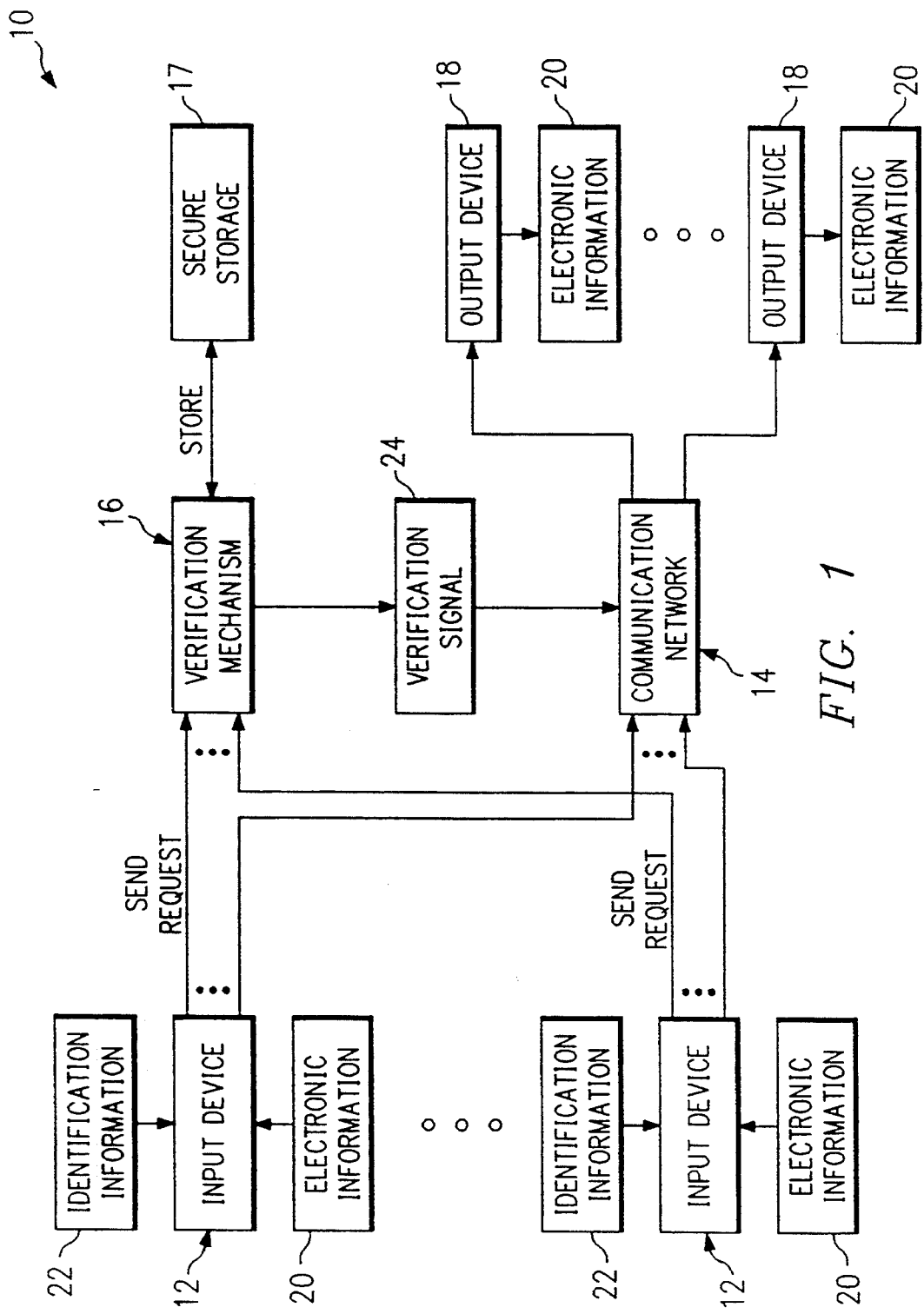
FIG. 1 illustrates one embodiment of the present invention where identification and verification on sender's side only is provided during transmission of electronic information.
Figure 2:
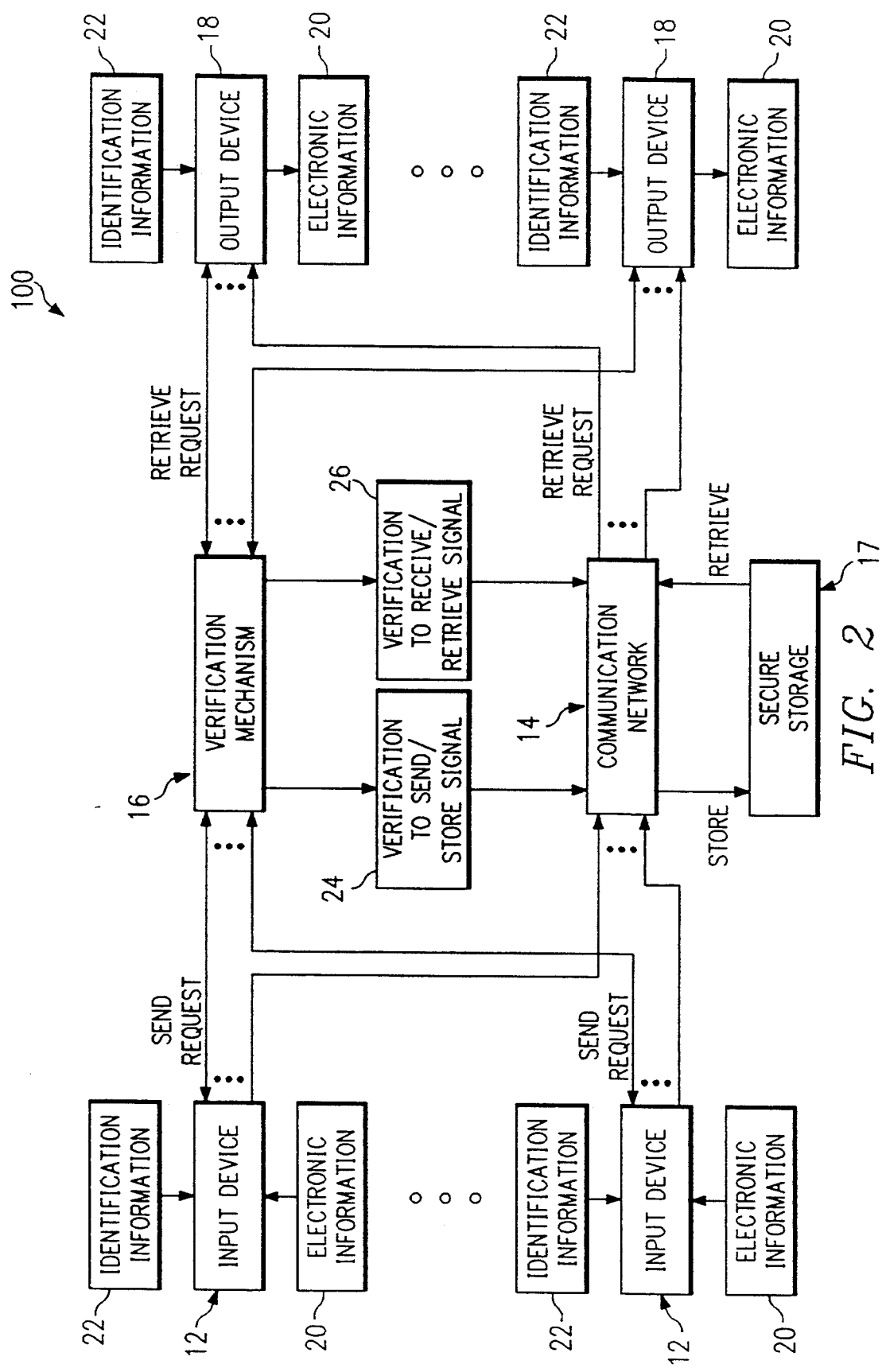
FIG. 2 illustrates another embodiment of the present invention using identification and verification of both the sender and receiver along with storage and retrieval capabilities during transmission of electronic information.

The preferred embodiments of the present invention are illustrated in FIGS. 1 and 2 of the drawings, like numerals being used to refer to like and corresponding parts of the various drawings.

This invention provides system 10 shown in FIG. 1 and System 100 shown in FIG. 2 for controlling access to and for authenticating the transmission of electronic information. Verification of the identity of senders and recipients of electronic information on a communication network are accomplished by spoken voice and/or written signature. Controlled access is provided for both sending and receiving electronic information.

One embodiment of the present invention as shown in FIG. 1, includes a plurality of input devices 12. Input devices 12 are connected to a communication network 14 and to a verification mechanism 16. The verification mechanism 16 is also connected directly to the communication network 14 by a verification signal 24. The verification mechanism 16 is also connected to a secure storage 17. Communication network 14 is connected to a plurality of output devices 18.

Communication network 14 may include all or part of the following communication systems and networks—telephone lines and telephone cables, fiber optic cables, microwave communication systems, satellite communication systems, wireless PBX systems within buildings, cellular telephones, and other commercial radio transmission systems. Input devices 12 and output devices 18 may include telephones, facsimile machines, modems, radio transmitters and radio receivers, teletype machines, and other transmitters and receivers of electromagnetic radiation.

The input devices 12 have an interface for accepting electronic information 20. This interface may be promake and receive an electronic information transmission.

Although the present invention has been described in detail, it should be understood that various changes, substitutions and alterations can be made hereto without departing from the spirit and scope of the invention so defined by the appended claims.

What is claimed is:

1. A system for authenticating the transmission of electronic information, comprising:
   a plurality of input devices for accepting electronic information and sender's identification information;
   a verification mechanism for verifying the sender and a recipient;
   a secure storage with templates, said secure storage having a time-stamp of transmission of electronic information transfer;
   a communication network for transmitting the electronic information;
   a transmission verification signal to said communication network;
   a receipt verification signal to said communication network; and
   a plurality of output devices for receiving the electronic information and accepting recipient identification information.

2. The system of claim 1, wherein said input and output devices accept spoken voice identification information.

3. The system of claim 2, wherein said verification mechanism comprises a voice recognition system.

4. The system of claim 2, wherein said secure medium of storage comprises spoken voice templates.

5. The system of claim 1, wherein said input and output devices accept written signature identification information.

6. The system of claim 5, wherein said verification mechanism comprises a signature recognition system.

7. The system of claim 5, wherein said secure medium of storage comprises written signature templates.

8. The system of claim 1, wherein said input and output devices accept spoken voice and written signature identification information.

9. The system of claim 8, wherein said verification mechanism comprises a voice and signature recognition system.

10. The system of claim 8, wherein said secure medium of storage comprises spoken voice and written signature templates.

11. The system of claim 1, wherein said communication network automatically sends the time-stamp of the transmission of the electronic information to the recipient.

12. A method for authenticating the transmission of electronic information, comprising the steps of;
   inputting electronic information and the sender's identification information;
   verifying the sender of the electronic information;
   storing identification information;
   transmitting the electronic information on a communication network;
   providing a transmission verification signal to said communication network;
   inputting the recipient's identification information;
   providing a receipt verification signal to said communication network;
   outputting the electronic information; and
   providing automatically a time-stamp of the transmission of the electronic information transfer to the sender.

13. The method of claim 12, further comprising the step of inputting the sender's and recipient's spoken voice identification information.

14. The method of claim 13, further comprising the step of verifying the spoken voices of the sender and recipient.

15. The method of claim 13, further comprising the step of storing spoken voice identification templates.

16. The method of claim 12, further comprising the step of inputting the sender's and recipient's written signature identification information.

17. The method of claim 16, further comprising the step of verifying the written signature of the sender and recipient.

18. The method of claim 16, further comprising the step of storing the written signature identification templates.

19. The method of claim 12, further comprising the step of inputting the sender's and recipient's spoken voice and written signature identification information.

20. The method of claim 19, further comprising the step of verifying the spoken voice and written signature of the sender and recipient.

21. The method of claim 19, further comprising the step of storing the spoken voice and written signature identification templates.

22. The method of claim 12, further comprising the step of storing the time-stamp of the transmission of the electronic information transfer.

23. The method of claim 22, further comprising the step of transmitting the time-stamp of the electronic information transfer to the sender automatically.

* * * * *